United States Patent
Wang

(10) Patent No.: US 7,679,247 B2
(45) Date of Patent: Mar. 16, 2010

(54) LIFT MAGNET MECHANISM FOR FLYWHEEL POWER STORAGE SYSTEMS

(75) Inventor: Jimpo Wang, Wilmington, MA (US)

(73) Assignee: Beacon Power Corporation, Tyngsboro, MA (US)

( * ) Notice: Subject to any disclaimer, the term of this patent is extended or adjusted under 35 U.S.C. 154(b) by 0 days.

(21) Appl. No.: 11/820,255

(22) Filed: Jun. 20, 2007

(65) Prior Publication Data

US 2008/0315696 A1   Dec. 25, 2008

(51) Int. Cl.
*H02K 7/09* (2006.01)
(52) U.S. Cl. ................ 310/90.5; 310/12; 310/14; 310/15; 310/74; 310/153
(58) Field of Classification Search .......... 310/12–39, 310/74, 90.5, 153, 216, 269
See application file for complete search history.

(56) References Cited

U.S. PATENT DOCUMENTS

| | | | | |
|---|---|---|---|---|
| 2,747,944 | A | * | 5/1956 | Baermann ................ 310/90.5 |
| 3,791,704 | A | * | 2/1974 | Perper ...................... 310/90.5 |
| 3,860,300 | A | * | 1/1975 | Lyman ..................... 310/90.5 |
| 4,285,552 | A | * | 8/1981 | Sutter ....................... 310/90.5 |
| 5,101,130 | A | * | 3/1992 | Jayawant et al. .......... 310/90.5 |
| 5,153,475 | A | * | 10/1992 | McSparran .......... 310/216.021 |
| 5,406,157 | A | * | 4/1995 | New ......................... 310/90.5 |
| 5,614,777 | A | | 3/1997 | Bitterly et al. |
| 5,710,469 | A | * | 1/1998 | Ries ......................... 310/90.5 |
| 5,894,181 | A | * | 4/1999 | Imlach ..................... 310/90.5 |
| 5,898,244 | A | * | 4/1999 | Kotsianas et al. ............ 310/14 |
| 6,025,668 | A | * | 2/2000 | Kolomeitsev ............... 310/187 |
| 6,259,179 | B1 | * | 7/2001 | Fukuyama et al. ........ 310/90.5 |
| 6,566,775 | B1 | * | 5/2003 | Fradella .................... 310/90.5 |
| 6,703,735 | B1 | * | 3/2004 | Gabrys ..................... 310/90.5 |
| 6,794,777 | B1 | | 9/2004 | Fradella |
| 2007/0164626 | A1 | * | 7/2007 | Taniguchi et al. .......... 310/90.5 |

OTHER PUBLICATIONS

PCT search report and written opinion dated Nov. 26, 2008 for international application No. PCT/US 08/07709PCT.

* cited by examiner

*Primary Examiner*—Quyen Leung
*Assistant Examiner*—John K Kim
(74) *Attorney, Agent, or Firm*—Pritzkau Patent Group LLC

(57) ABSTRACT

Electric power is stored in a flywheel assembly, from a dc power buss, and supplied to the buss, through electronics associated with a motor/generator, its rotor integral with a flywheel supported by magnetic bearings. Upon operation, the flywheel assembly is released by mechanical backup bearings which then normally remain disengaged until shutdown as the flywheel assembly is levitated by the axial magnetic field. Enhancements developed herein smooth the flux density across discontinuities or segments present in permanent magnets due to presently limited capability for manufacture of large annular magnetic members. Herein, the introduction of a medium such as a steel cylindrical member to directly interface with the rotor as opposed to the segmented permanent magnet, greatly eradicates induced eddy current and heat on the rotor. In addition, exhibited is an annularly slotted rotor which allows for greater surface area for flux absorption.

5 Claims, 9 Drawing Sheets

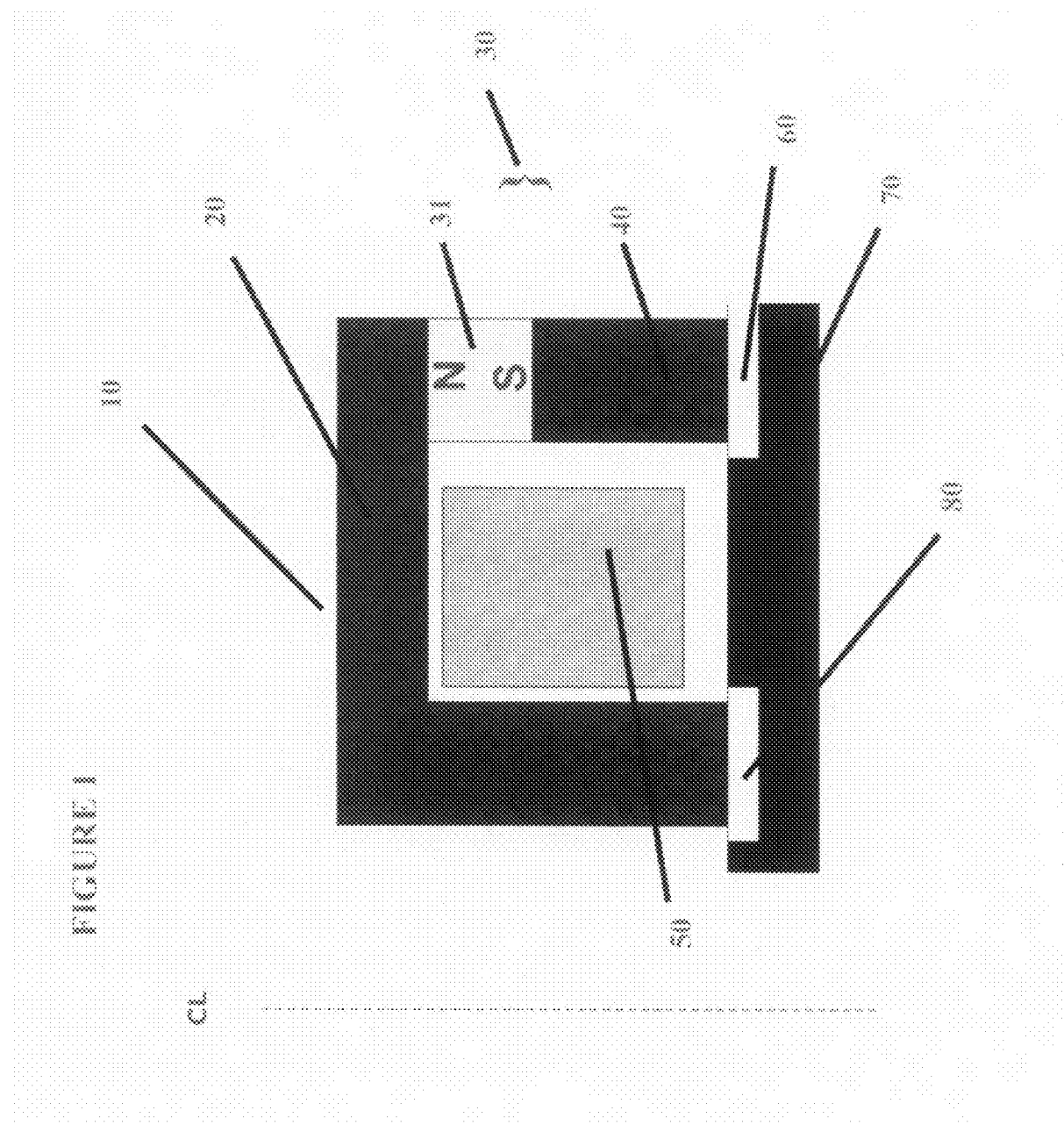

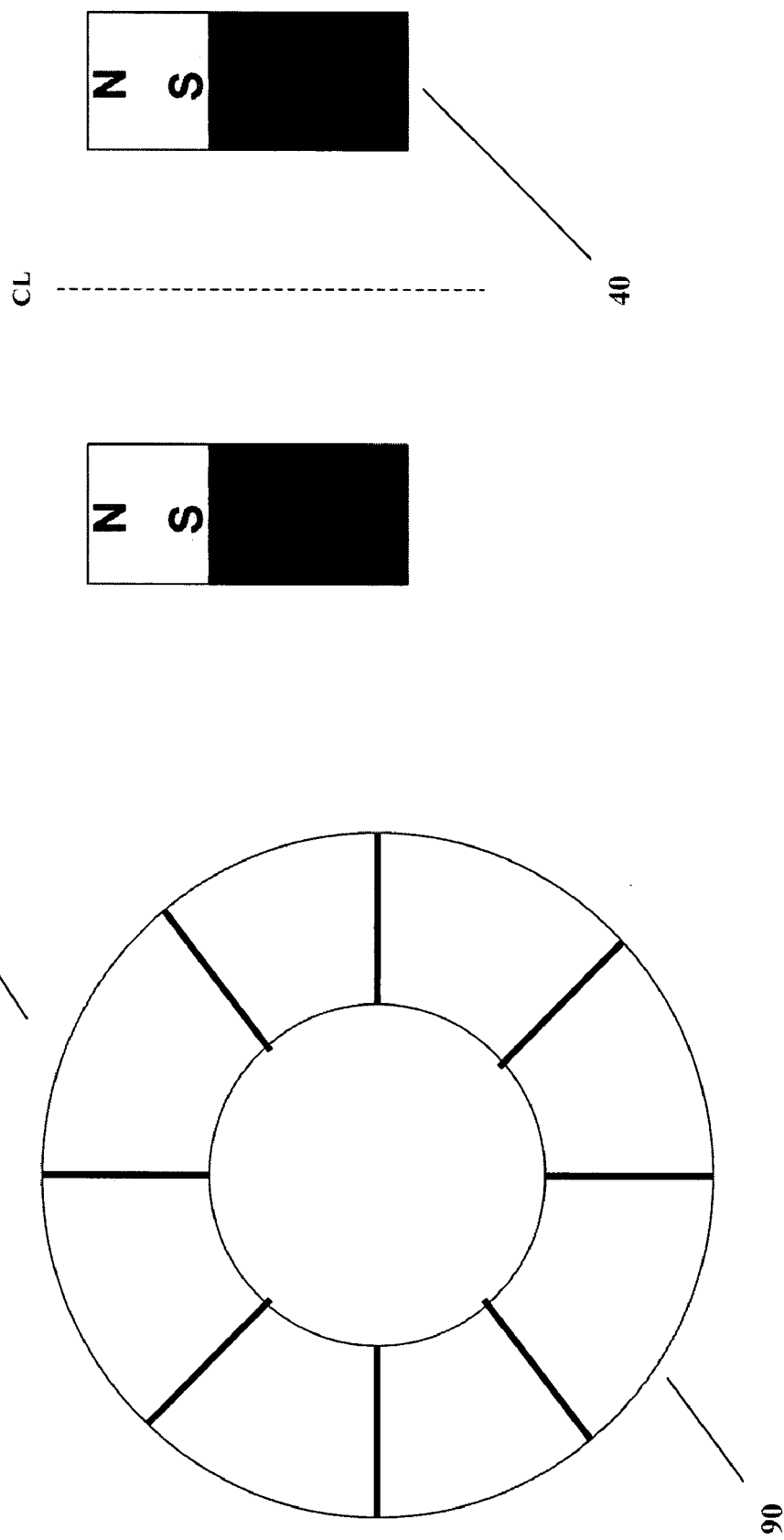

LIFT MAGNET MECHANISM FOR FLYWHEEL POWER STORAGE SYSTEMS

FIELD OF THE INVENTION

The present invention relates generally to flywheel driven power storage systems and particularly to enhancements developed to smooth the flux density across discontinuities or segments present in permanent magnets due to present manufacturing capability.

REFERENCES

In general within the art, descriptions of flywheel driven power storage systems and their various related elements can be found in U.S. Pat. Nos. 5,614,777 set forth by Bitterly et al; 5,767,595, 5,708,312, 5,770,909, and 5,864,303 by Rosen et al; 3,860,300 and 4,147,396 by Lyman; 3,791,704 and 4,088,379 by Perper; 5,627,419 by Miller; 4,910,449 by Hiyama et al: 5,760,510 by Nomura et al: 5,777,414 by Conrad; 5,319,844 by Huang et al; 4,444,444 by Benedetti et al; 5,844,339 by Schroeder et al; 5,495,221, 5,783,885, 5,847,480, 5,861,690, and 5,883,499 by Post; 5,705,902 by Merritt et al; 5,044,944 and 5,311,092 by Fisher; 5,107,151 and 5,677,605 by Cambier et al; and 5,670,838 by Everton; plus 3,969,005, 3,989,324, 4,094,560, and 4,141,607 by Traut; and 4,799,809 by Kuroiwa.

More specific to the instant invention, U.S. Pat. No. 6,566,775 addresses use of electromagnets and permanent magnets to lift the rotor off of the bearings in flywheel applications in order to increase bearing life, reduce heat and eddy currents.

BACKGROUND OF INVENTION

This invention relates to electric power storage, through power interface electronics and electromechanical energy conversion, in the inertia of a spinning flywheel, and by reciprocal means, stored kinetic energy conversion to electric power. The various component elements of the invention include: A high-speed motor/generator, with cooperative power electronics and magnetic bearings, electronic feedback control servos to stabilize the magnetic bearings, a vertical-axis flywheel, integral with the motor/generator rotor and rotatable magnetic bearing elements, to store kinetic energy, a vacuum enclosure to reduce air drag, mechanical backup bearings that are not engaged during normal service, and a stationary energy-absorbing installation site to safely house the flywheel and its enclosure.

As also illustrated in the above-referenced United States patents, such means as rechargeable electrochemical batteries offer some usages, but encounter huge problems involving key issues such as storage space, leakage and longevity. Therefore flywheel driven systems may offer distinct advantages over such systems. However, as flywheel power storage system designs have evolved from smaller, physically limited structures with minimal storage capacity to the high capacity systems employing industrial sized magnetic members prevalent today, material restrictions and other such factors inherent with have arisen. Said considerations must be overcome in order to facilitate reaching the maximal energy storage and output to render flywheel energy storage systems a viable alternative.

In modern applications, due to the need for extremely large magnetic arrays and magnetic members, current manufacturing capabilities restrict magnetic arrays to structures containing joined magnetic segments. Due to the inherent discontinuities in flux density across these segments occurring upon interface of the rotor and stator, if faced directly with rotor, the permanent magnet array will induce eddy current and excess heat upon the rotor. Thus, in order to address this shortcoming, what is needed is a mechanism and/or system which works to eradicate these problems by vitiating or smoothing out the discontinuities from the segments.

Additionally, in modern larger applications, magnetic force generated either by permanent magnet or electromagnet or the combination of both is used to lift the rotor in a flywheel system. Magnetic force generated by a pair of stationary stator and rotor is normally highly sensitive to the air gap separating the stator and rotor. High sensitivity implies low magnetic force as the gap is large and excessively high force as the gap is small. Lower force at the large gap requires designs with either stronger magnets or higher current to lift the rotor, and excessively high force at small gap would potentially damage the parts under the fault conditions.

Previous failure of high capacity flywheel systems often is found to be triggered by overloading and overheating of the touchdown ball bearing. When utilizing a pure electromagnet lift magnet, failure offer occurs as the electrical power is tripped during normal operation due to the high lifting force requirement. As the lifting force dissipates, the heavy rotor will then sit on the ball bearings, and thus, due to the heavy load, will heat up the ball bearings in a short expense of time. Thus, as the ball bearing fails, the high speed rotor loses the mechanical support, and rotates basically out of round, contacting the casing. Thus, wear, catastrophic at times and even explosions within the casing may occur.

Further, in systems utilizing magnetic force generated either by a permanent magnet or electromagnet or the combination of both to lift the rotor, the magnetic force generated by a pair of stationary stators and rotor is normally highly sensitive to the air gap separating the stator and rotor. High sensitivity implies that low magnetic force occurs when the gap is large in magnitude and excessively high force occurs when the gap is small in magnitude. The larger gap condition at which lower force occurs requires designs with either stronger magnets or higher current to lift the rotor; whereas, on the other hand, the excessively high force at small gap could potentially damage parts or the overall system under fault conditions.

Therefore, when investigating the typical lift magnet design, what is needed is a design that can provide magnetic force with low gap sensitivity, for the conditions at which the magnetic force is moderately higher at the large gap configuration and significantly lower at the small gap configuration. Additionally, what is needed is a system, mechanism or method of operation, which minimizes the load on the ball bearings in the case where the rotor drops on the bearing for any potential failure mode. Also needed is a system to prevent the high speed rotor form sticking to the stator under any potential failure mode while also minimizing the electrical power used in the lift magnet system to minimize the heat generation which lends to superior control of the rotor.

SUMMARY OF THE INVENTION

The instant invention, as illustrated herein, is clearly not anticipated, rendered obvious, or even present in any of the prior art mechanisms, either alone or in any combination thereof. A flywheel driven power storage system, adapted to compensate for the aforementioned drawbacks and limitations would afford significant improvement to numerous useful applications. Thus the several embodiments of the instant invention are illustrated herein.

The salient objectives of the instant invention center around improvement of high capacity, flywheel energy storage systems and particularly around improvement upon inherent bearing wear, control of magnetic flux and minimization of required lift power fluctuation. Thus, creation of a system, subsystem, mechanism or method of operation which minimizes the load on the ball bearings, in the case where the high speed rotor should release and begin to plummet down on the ball bearings during potential failure mode, is crucial.

It is an additional objective of the instant invention to provide a flywheel power storage system possessing a motor/generator with minimal eddy current losses which displays use of mechanical bearings only as temporary backup as a rotor integral primary magnetically driven primary bearing system relieves wear on the mechanical bearings.

Further, as in any flywheel driven system, general objectives of this invention are to provide improved long-life flywheel batteries without sizable power losses, excessive internal heating, vacuum loss, extensive maintenance, explosion hazard and high cost.

It is an added objective of the instant invention to prevent the high speed rotor from becoming affixed to the stator due to extreme force and heat considerations experienced under any potential failure mode.

It is a further objective of the instant invention to enable the flywheel system to operate under cooler conditions and thus prevent inherent overheating and rotor and stator attachment, or sticking.

Another objective of the instant invention is to minimize the electrical power used in the lift magnet system, which inherently minimizes the heat generation, but additionally maintain proper control of the rotor.

Another objective of the instant invention is to provide an apparatus comprising a cylindrically shaped steel pole mechanism disposed to cover the segmented magnet array and thus during interface with any configuration of stator in order to minimize the eddy current and ambient heat. Thus use of said apparatus inherently minimizes stator winding heating, resulting thermal stresses, and possible outgassing of resin molding when such materials are utilized.

It is another objective of the instant invention to introduce an apparatus that provides magnetic force with low gap sensitivity and wherein the magnetic force is moderately higher at the large gap and significantly lower at the small gap.

Another objective is to eliminate need for lubricants in mechanical backup bearings, to remove a cause of vacuum loss, frequent maintenance, and mechanical bearing failures.

Thus, one specific objective of the instant invention is to provide a system that eradicates the power spikes generated by prior systems due to physical spacing consideration inherent in applications possessing large circular pieced together magnet members.

Accordingly, an improved flywheel battery system and accompanying enhancements its component elements are herein described, which achieve these objectives, plus other advantages and enhancements. These improvements to the art will be apparent from the following description of the invention when considered in conjunction with the accompanying drawings wherein there has thus been outlined, rather broadly, the more important features of the vehicle monitoring system in order that the detailed description thereof that follows may be better understood, and in order that the present contribution to the art may be better appreciated.

There are additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

These together with other objects of the invention, along with the various features of novelty, which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE SEVERAL VIEWS OF THE DRAWING

FIG. 1 illustrates a simplified cutaway assembly block diagram of the magnetic lift portion of the instant flywheel battery, illustrating the stator housing, the permanent magnet array which is comprised of segmented magnet array and the steel cylindrical member or pole, the coil, and the rotor, centered around the axis of rotation;

FIG. 2 is a top view of the permanent magnet array illustrating the segmented nature of the segmented magnet array;

FIG. 3 is block diagram illustrating the steel cylindrical member or pole;

DETAILED DESCRIPTION OF THE EMBODIMENTS

Figure 4:
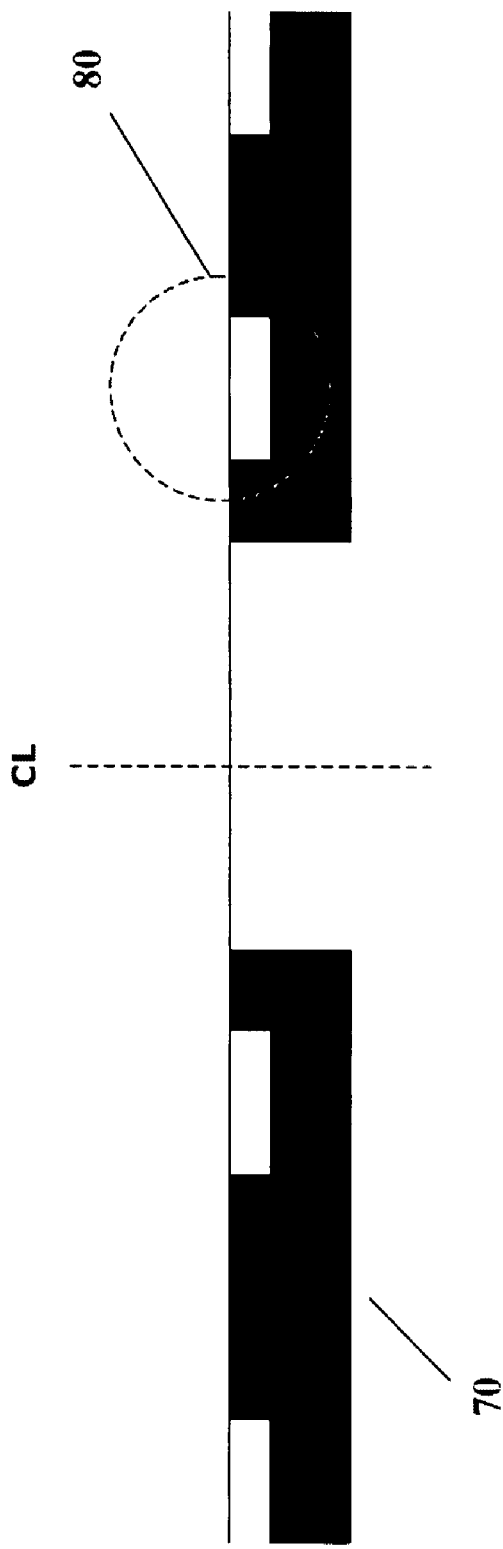
FIG. 4 is a side view of the rotor in the slotted embodiment.

In flywheel driven power storage systems, the magnetic force generated either by permanent magnet or electromagnet or the combination of both is used to lift the rotor in a flywheel system. The magnetic force generated by a pair of stationary stator and rotor is normally highly sensitive to the air gap separating the stator and rotor. High sensitivity implies low magnetic force, as the gap is large and excessively high force as the gap is small.

In order illustrate the numerous embodiments of the instant invention, referring first to FIG. 1 illustrates a simplified cutaway assembly block diagram of the flywheel power storage system magnetic ring apparatus 10 or magnetic lift portion of the instant flywheel battery, illustrating the stator housing and assembly 20, the permanent magnet array 30 which is comprised of segmented magnet array 31 and the steel cylindrical member 40 or pole 40, the coil 50, the gap between rotor and stator, or rotor/stator gap 60, and the rotor 70 including the slot 80.

Next, referring to FIG. 2 is a top view of the permanent magnet array 30, illustrating the individual segments 90 of the magnet array. FIG. 3 is a block diagram illustrating the steel cylindrical member 40 or pole 40, designed to compensate for the segmented magnet array 31 and the discontinuity of the individual segments 90 which is problematic because it induces the magnetic flux variation which in turn generates the heat on the rotating member.

Figure 5:
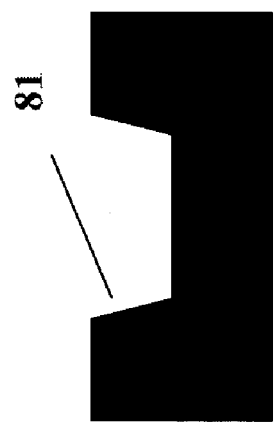
FIG. 5 is a side view of the rotor, illustrating the slotted construction in a chamfered embodiment.

FIG. 4 is a side view of the rotor 70, illustrating the novel slotted construction 80, which allows for greater surface area for further magnetic flux leakage to the walls and thus for more ready control of fluctuation in lifting force. FIG. 5 is a side view of the rotor 70, illustrating the slotted construction 80 in a chamfered version 81, which additionally allows for more surface area for further magnetic flux leakage to the walls for more ready control of fluctuation in lifting force.

Figure 7:
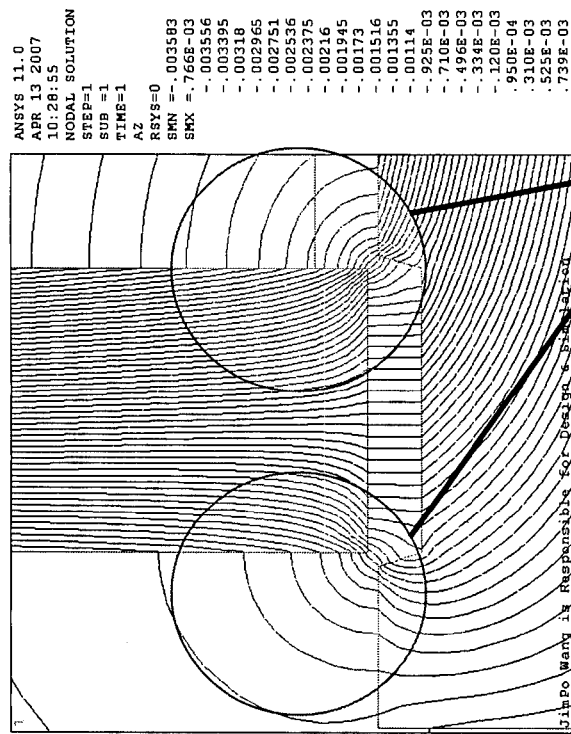
FIG. 7 is a finite element analysis readout illustrating the magnetic flux created when utilizing a slotted rotor at a large gap between rotor and stator.
Figure 6:
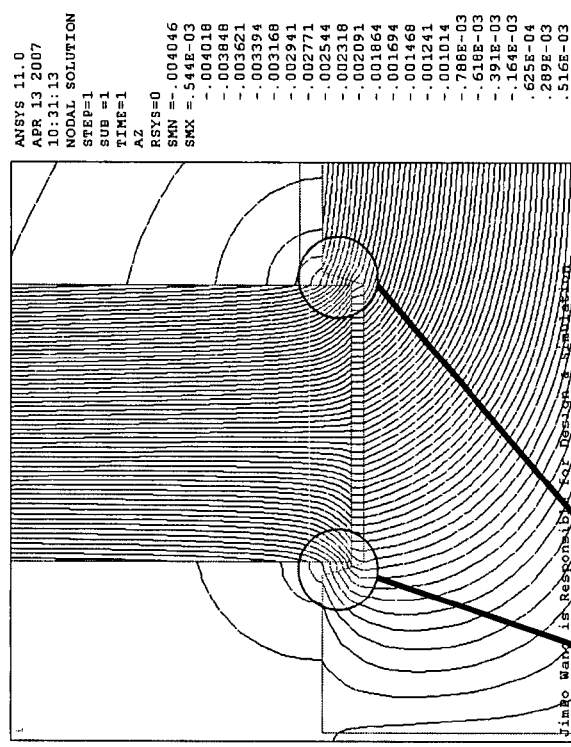
FIG. 6 is a finite element analysis readout illustrating the magnetic flux created when utilizing a slotted rotor at a small gap between rotor and stator.

FIG. 6 is a readout of a finite element analysis illustrating the magnetic flux 101 created when utilizing a slotted rotor 80 at a small gap between rotor 70 and stator housing and assembly 20. Similarly, FIG. 7 is a readout of a finite element analysis illustrating the magnetic flux 102 created when utilizing a slotted rotor at a large gap between rotor and stator.

Figure 8:
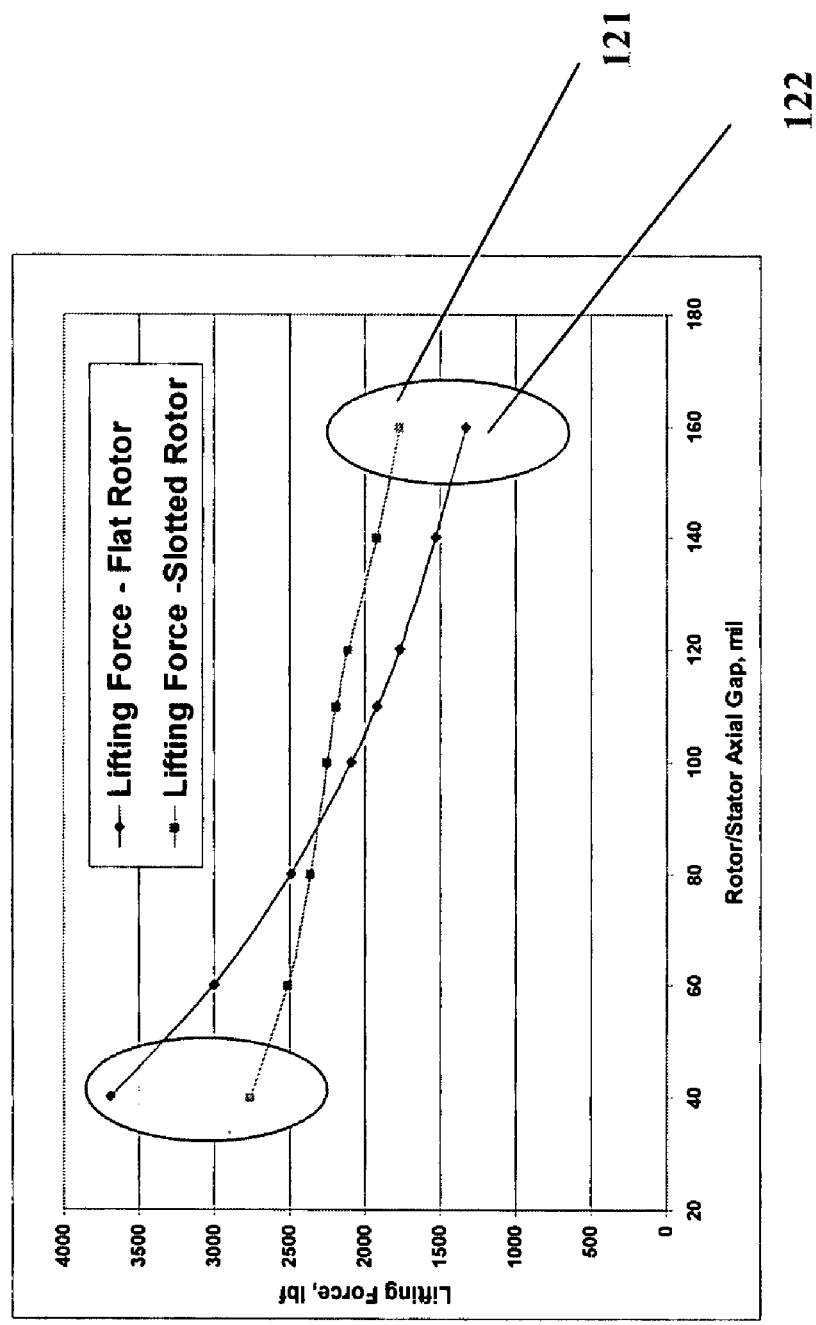
FIG. 8, a graphical representation, illustrates that the due to the use of the slotted rotor, the differential between lifting force needed from large rotor/stator gap to small rotor/stator gap, becomes dramatically lessened than the differential between lifting force with the prior rotors.

As illustrated in FIG. 8, graphical representation, due to the use of the slotted rotor 80, the differential between lifting force needed from large rotor/stator gap to small rotor/stator gap 121 with the slotted rotor, becomes dramatically lessened than the differential between lifting force with the prior rotors 122.

Figure 9:
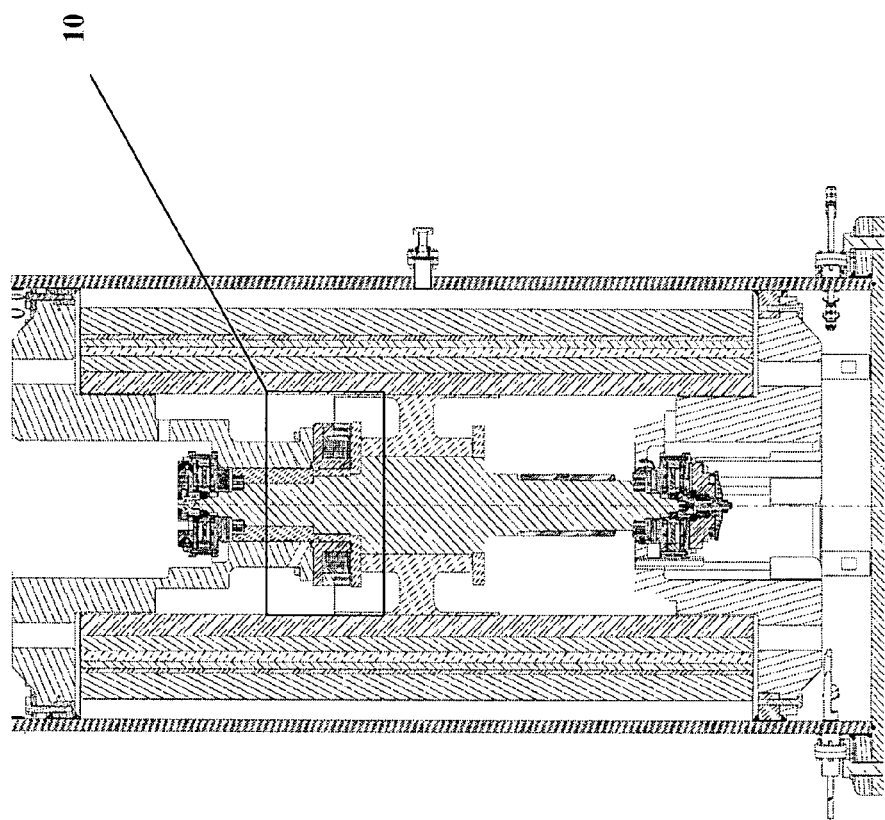
FIG. 9 illustrates a side cutaway view of the novel assembly within an actual flywheel power storage system.
Figure 10:
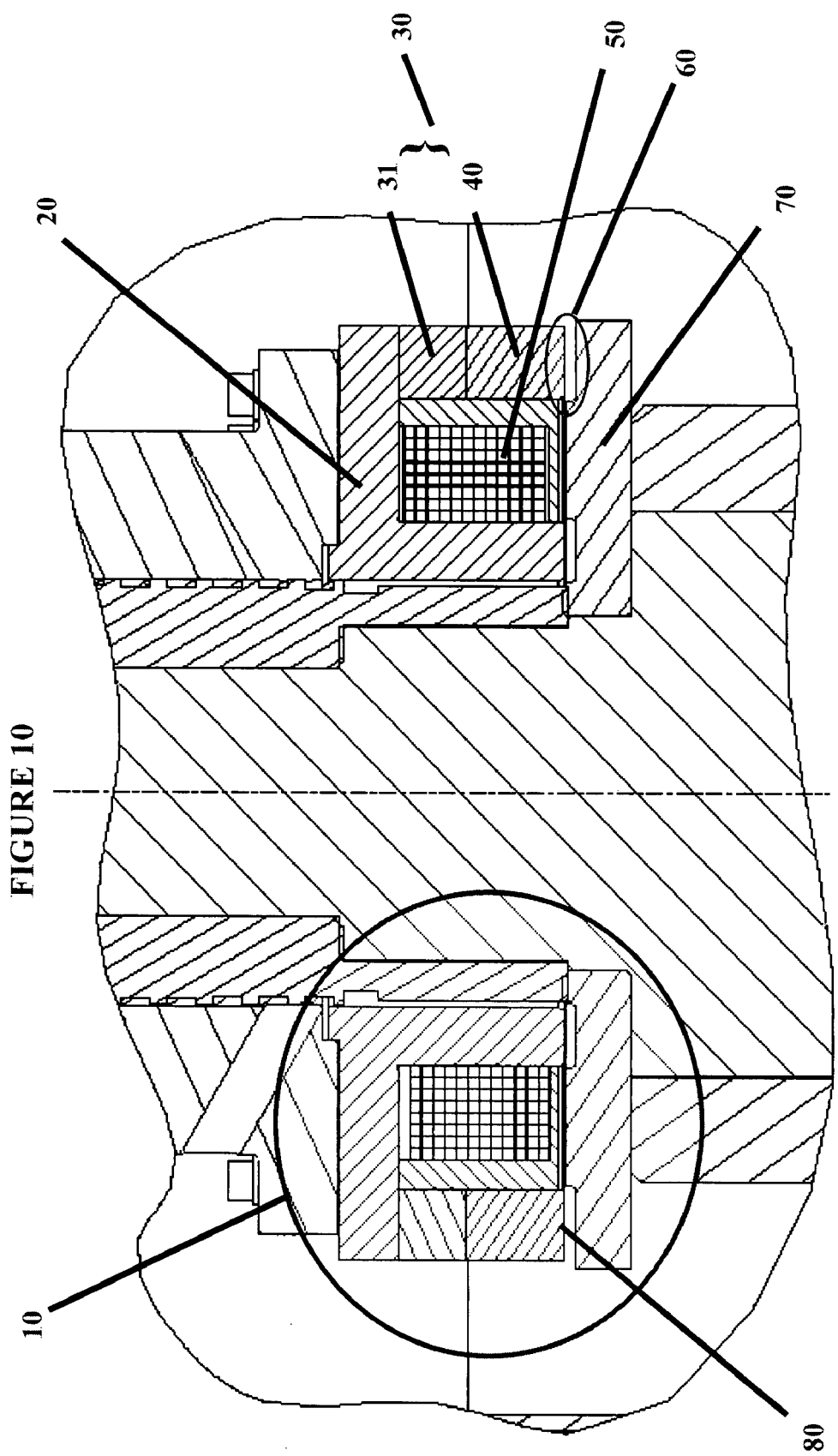
FIG. 10 is a side cross-sectional three dimensional view of the overall apparatus illustrating the flywheel power storage system magnetic ring apparatus, illustrating the stator housing and assembly, the permanent magnet array which is comprised of segmented magnet array and the steel cylindrical member or pole, the coil, the gap between rotor and stator, or rotor/stator gap, and the rotor including the slot.

FIG. 9 illustrates a side cutaway view of the instant magnetic ring or magnetic lift system 10 within an actual flywheel power storage system. FIG. 10 is a side cross-sectional three dimensional view of the overall apparatus illustrating the flywheel power storage system magnetic ring apparatus 10, illustrating the stator housing and assembly 20, the permanent magnet array 30 which is comprised of segmented magnet array 31 and the steel cylindrical member 40 or pole 40, the coil 50, the gap between rotor and stator, or rotor/stator gap 60, and the rotor 70 including the slot 80.

Figure 11:
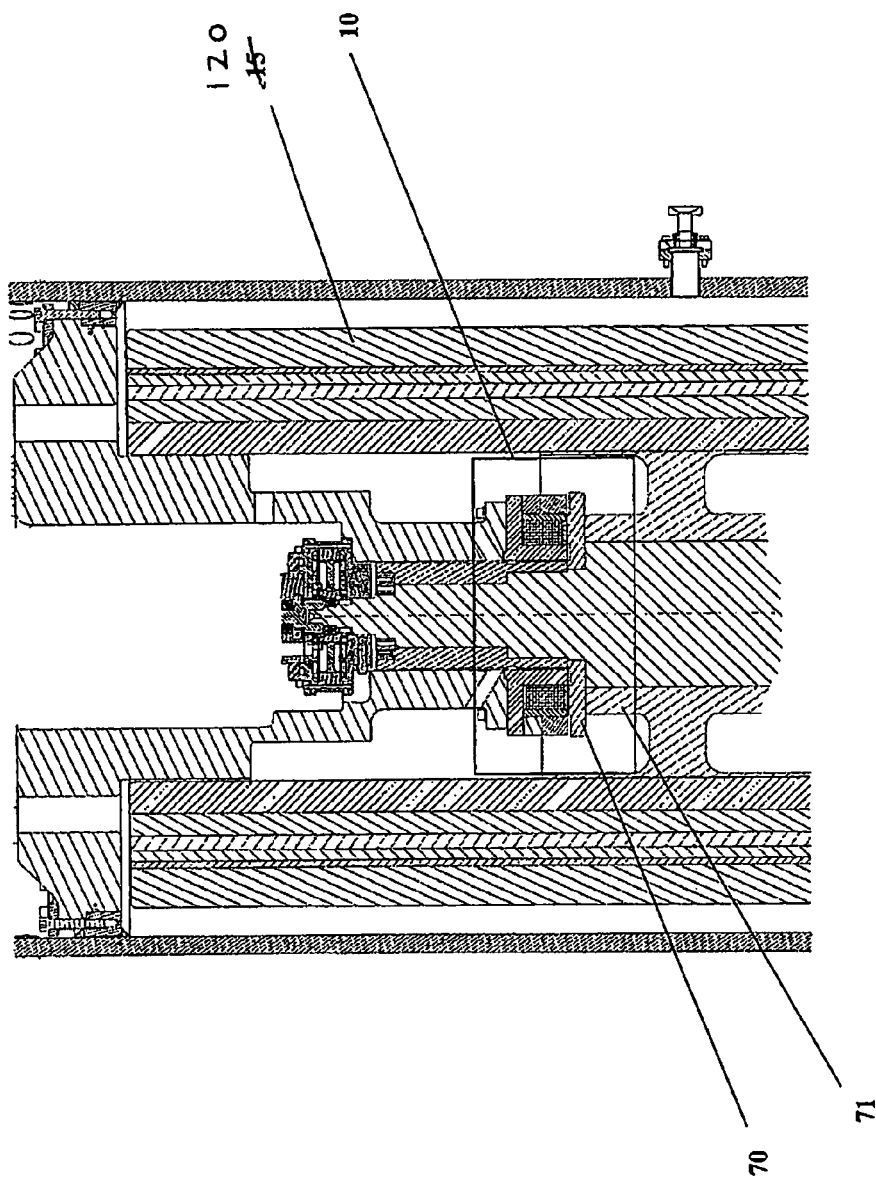
FIG. 11 is a side cross-sectional view exhibiting the rotor attached to its vertical-axis spindle which interfaces with the flywheel rim, is axially levitated by attraction forces between high permeability steel at the upper end of rotor, and the interaction of the segmented magnet array.
Figure 12:
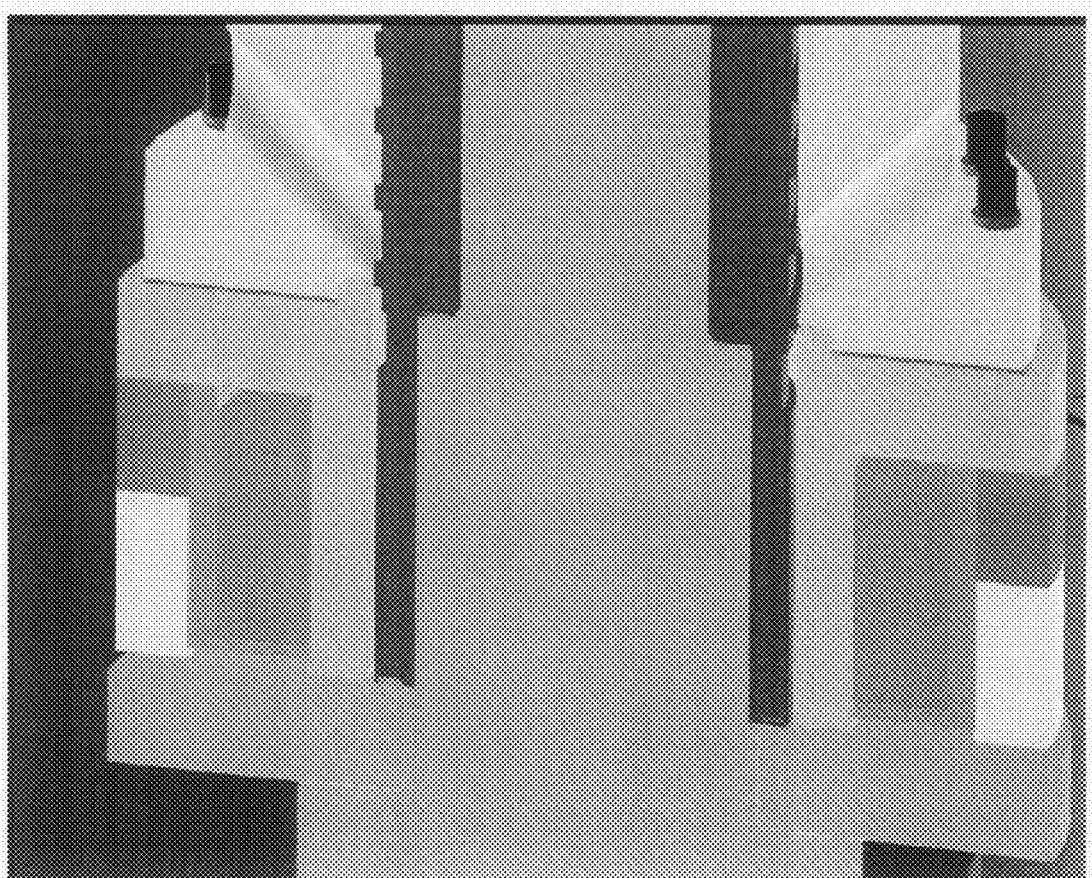
FIG. 12 is isometric cutaway view of the invention illustrating all of the elements.

With reference to FIG. 11, the rotor 70, attached to its vertical-axis spindle 71 and to flywheel rim 120, is axially levitated by attraction forces between high permeability steel or other appropriate material located at the upper end of rotor 70 and the non-rotating segmented magnet array 31 and the non-rotating, high-permeability, annular steel cylindrical member 40 or pole 40, located at the upper and lower side of the non-rotating, annular, axially-magnetized, permanent magnet array 30. Concentric coil 50, which performs as an electromagnet, is provided bi-directional drive current and the overall evolutional provides inherently stable centering forces, due to the same magnetic field that provides axial levitation for the flywheel rim 120.

This ability to magnetically levitate the flywheel rim during operation allows for great reduction in normal wear on bearings, magnetic members and steel members and also minimizes ill effects such as eddy current losses, plastic deformity or the like, specifically because no iron, high-permeability steel or magnet members are subjected to continuous magnetic flux cycling, nor to substantial magnetic flux variation, due to rotor spin. This condition holds especially true as the steel cylindrical member in the instant invention replaces the permanent magnet in interfacing with the rotor, thus smoothing the magnetic flux.

As illustrated herein, in order to avoid overloading and overheating of the ball bearings as the rotor drops on the bearing system, the instant invention introduces a hybrid type of lift magnet system which includes the permanent magnet array to provide the majority of the lifting force to ensure the ball bearing system will not be overloaded, even upon failure of the electromagnet system. Our permanent magnet array is made of segment magnets covered with magnetic steel pole which smoothes the flux density to avoid eddy current loss and heat generation on the rotor. The electromagnet in the instant lift magnet system only provides a small portion of the lifting force to control the rotor/stator gap.

With the instant permanent magnet array, much lower current and power is required for the electromagnet. The instant flywheel system will operate and remain cooler with less heat generation, while the slotted rotor provides a relatively constant lifting force. As discussed above in the background section, when investigating the typical lift magnet design, what is needed is a design that can provide magnetic force with low gap sensitivity, for the conditions at which the magnetic force is moderately higher at the large gap configuration and significantly lower at the small gap configuration. Compared with the usual rotors lacking the slotted arrangement, the instant slotted rotor design provides the aforementioned needed characteristics, including greater lifting force at the large gap configuration and significantly lower lifting force at the small gap configuration.

While several embodiments of the present invention have been illustrated by way of example, it is apparent that further embodiments could be developed within the spirit and scope of the present invention. However, it is to be expressly understood that such modifications and adaptations are within the spirit and scope of the present invention, as set forth in the following appended claims.

I claim:

1. A flywheel levitation apparatus for a flywheel driven power storage system, said apparatus comprising:
    a rotor having a rotor face that faces upward in a vertical direction, and an axis of rotation that is at least approximately aligned with said vertical direction, and said rotor is supported for (i) rotation around said axis and (ii) a limited amount of vertical movement along the axis to provide for levitating the rotor;
    a stator assembly that is configured to receive an electrical current and to generate a magnetic flux therefrom; and
    at least one pole piece supported by said stator and having a cylindrical projecting section, in the form of a cylindrical member, having a cylindrical wall with a wall thickness extending downward toward said rotor face and including a lower surface that faces downward toward said rotor, and said projecting section is configured for channeling said magnetic flux toward said rotor to exert a magnetic lifting force upon said rotor upward and in said vertical direction such that said lifting force influences said vertical movement, wherein said rotor face defines a cutaway section cooperatively arranged with said projecting section in the form of an annular slot that is widthwise delimited by a pair of opposing upwardly extending peripheral sidewalls, having a width that is sufficient for receiving the wall thickness of the pole piece, and the sidewalls are arranged such that said projecting section is at least partially receivable in the cutaway section, between said sidewalls, responsive to the vertical movement of the rotor along said axis of rotation, and said annular slot has a floor that faces upward in a confronting relationship with said lower surface of said projecting section to define a gap, having a gap size, between said rotor and said pole piece, and said gap size changes in response to the vertical movement of the rotor along said axis of rotation, and said magnetic lifting force exhibits a gap sensitivity that is smaller as compared to a conventional gap sensitivity that would be exhibited in an absence of said cutaway section, and said rotor is operable in each one of (i) a large gap configuration corresponding to a large gap size, and (ii) a small gap configuration corresponding to a small gap size, and at least a selected one of the pair of sidewalls intersects a major surface of said rotor face to form a peripheral edge such that the peripheral edge joins the selected sidewall with the major surface, and in said large gap configuration a portion of said magnetic flux is oriented from said projecting section towards said peripheral edge to influence the magnetic levitation force such that the magnetic levitation force is larger as compared to a conventional large gap magnetic levitation force that would be exhibited in a conventional flywheel levitation apparatus having the same large gap size, and in the absence of said cutaway section.

2. The flywheel levitation apparatus of claim 1 wherein each of said pair of sidewalls is aligned in an approximately vertical direction, and said sidewalls are arranged such that said pole piece is at least partially receivable, responsive to said vertical movement of the rotor, between said sidewalls.

3. A flywheel levitation apparatus for a flywheel driven power storage system, said apparatus comprising:

a rotor having a rotor face that faces upward in a vertical direction, and an axis of rotation that is at least approximately aligned with said vertical direction, and said rotor is supported for (i) rotation around said axis and (ii) a limited amount of vertical movement along the axis to provide for levitating the rotor;

a stator assembly that is configured to receive an electrical current and to generate a magnetic flux therefrom; and at least one pole piece supported by said stator and having a cylindrical projecting section, in the form of a cylindrical member, having a cylindrical wall with a wall thickness extending downward toward said rotor face and including a lower surface that faces downward toward said rotor, and said projecting section is configured for channeling said magnetic flux toward said rotor to exert a magnetic lifting force upon said rotor upward and in said vertical direction such that said lifting force influences said vertical movement, wherein said rotor face defines a cutaway section cooperatively arranged with said projecting section in the form of an annular slot that is widthwise delimited by a pair of opposing upwardly extending peripheral sidewalls having a width that is sufficient for receiving the wall thickness of the pole piece, and the sidewalls are arranged such that said projecting section is at least partially receivable in the cutaway section, between said sidewalls, responsive to the vertical movement of the rotor along said axis of rotation, and said annular slot has a floor that faces upward in a confronting relationship with said lower surface of said projecting section to define a gap, having a gap size, between said rotor and said pole piece, and said gap size changes in response to the vertical movement of the rotor along said axis of rotation, and said magnetic lifting force exhibits a gap sensitivity that is smaller as compared to a conventional gap sensitivity that would be exhibited in an absence of said cutaway section, and said rotor is operable in each one of (i) a large gap configuration corresponding to a large gap size, and (ii) a small gap configuration corresponding to a small gap size, and said floor of said slot has a first width, and the rotor face defines an upper opening leading into said slot and having a second width, and at least one of said sidewalls is chamfered such that the second width is larger than the first width, and said sidewalls are arranged such that said pole piece is at least partially receivable, responsive to said vertical movement of the rotor, between said sidewalls.

4. The flywheel levitation apparatus of claim 3 wherein an inner one of said pair of sidewalls is chamfered such that the inner sidewall slants inward, towards the axis of rotation, and said sidewalls are arranged such that said pole piece is at least partially receivable, responsive to said vertical movement of the rotor, between said sidewalls.

5. The flywheel levitation apparatus of claim 3 wherein an outer one of said pair of sidewalls is chamfered such that the outer sidewall slants outward, away from the axis of rotation, and said sidewalls are arranged such that said pole piece is at least partially receivable, responsive to said vertical movement of the rotor, between said sidewalls.

* * * * *